United States Patent Office 3,336,131
Patented Aug. 15, 1967

3,336,131
METHOD OF CONTROLLING PLANT GROWTH
Edward D. Weil, Yonkers, N.Y., Jerome Linder, Westfield, N.J., and Edwin Dorfman, Grand Island, N.Y., assignors to Hooker Chemical Corporation, Niagara Falls, N.Y., a corporation of New York
No Drawing. Filed Sept. 26, 1966, Ser. No. 581,727
10 Claims. (Cl. 71—107)

This is a continuation-in-part of S.N. 109,879, filed May 15, 1961, now issued as U.S. Patent No. 3,280,174.

This invention describes a novel class of herbicides derived from o-xylene. More specifically, this invention relates to the method of using dihalo-ortho-tolylacetic acids and their derivatives as herbicides and as intermediates for preparing other herbicides and pesticides. The compositions of this invention are of the structure:

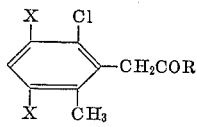

wherein R is an organic radical selected from the group consisting of hydroxy, alkoxy of from 1 to 18 carbon atoms, alkoxyalkoxy, alkoxyalkoxyalkoxy, haloalkoxy, phenoxy,, alkyl substituted phenoxy, amino, alkyl substituted amino wherein the alkyl scbstituent contains from 1 to 18 carbon atoms, and halogen, and X is a member of the group consisting of hydrogen and halogen with the proviso that one and only X be hydrogen. Where R is hydroxy, the corresponding salts are also included.

When the R substituents of the compounds of this invention is a carbon containing group, such group is preferably of 1 to about 26 carbon atoms and more preferably of 1 to 18 carbon atoms. Examples of such R substituents include but are not limited to alkoxy such as methoxy, ethoxy, propoxy, isopropoxy, butoxy, isobutoxy, amyloxy, isomyloxy hexyloxy, isohexyloxy, heptyloxy, isoheptyloxy, octloxy, nonyloxy, and the like, substituted alkoxy such as 2-chloroethoxy, methoethoxy, ethoxyethoxy, butoxyethoxy, methoxypropoxy, ethoxyethoxyethoxy, butoxyethoxyethoxy, butoxyethoxypropoxy, and the like, heterocylicalkoxy such as furfuroxy, tetrahydrofurfuroxy, trichlorofurfuroxy and the like aryloxy, phenylalkoxy and substituted aryloxy such as phenoxy, xyloxy and the like, amino substituents such as the mono- and di-methyl, ethyl, propyl, isopropyl, butyl, amyl, hexyl, heptyl, octyl, nonyl, decyl and stearyl amides as well as the simple unsubstituted amides, the piperidide and morpholide, acid halides, the sodium, potassium, lithium, ammonium, monoalkylammonium, dialkylammonium, and trialkylammonium salts of 3,6- and 5,6-dichloro-ortho-tolylacetic acids. The salts are in general considered herbicidal equivalents to the acid, although the above named salts are preferred because of water solubility and low cost.

While all of the compounds of this invention are herbicidal to a useful degree, as in any large group of compounds, it is not unexpected to find a smaller group or class within this large group of compounds which are superior as herbicides to the rest of the genus. Thus, the applicants have found that a narrower group of superior compounds, constituting the preferred embodiment composition-wise, would be the 3,6-dichloro-o-tolylacetic acid and its alkali metal, ammonium, and lower alkylammonium salts, its amide and its phenyl ester.

That these novel compositions of matter are herbicidal is most surprising and unexpected in view of the substantial inactivity of closely related compounds. For example, the known monochlorophenylacetic acids are substantially inactive, the trichloro- and tetrachloro- analogs are likewise valueless, and the isomers wherein the methyl group is meta or para to the carboxyl group are also valueless as herbicides. Thus, it is most unusual to find that the presence of a second chloro group on the ring and the ortho relationship between the methyl group and the carboxyl group is critical in the imparting of herbicidal properties to these compounds. Equally surprising is the finding that those compositions where one of the two chlorine atoms is para to the carboxyl group (the 4 position), are much inferior as herbicides to those structures where the chlorines are ortho and meta to the acid group. The unsuitability of the 4-chlorinated isomers as herbicides notwithstanding, the 3,4- and 4,5-dichloroo-tolylacetic acid and derivatives may be present to varying degrees in the reaction mixtures used for herbicidal purposes. Due to tedious and expensive separation procedures required to remove these isomers formed during the chlorination step of the preparative process, for reasons of economic practicality, we prefer to utilize 3,6-dichloro-o-tolyacetic acid in the form of a crude containing in the range of 35 to 65 percent 3,6-isomer, the remainder being principally 4,5-, 3,4- and 5,6-dichloro-o-tolylacetic acids, said mixture arising by the method of preparation described in the first example below.

The novel compositions of this invention offer several major advantages over related compounds in the prior art. For example, these compounds are inexpensive to prepare, are active against a variety of perennial and annual weeds and grasses including bindweed, sorrel, crabgrass, chickweed, and other troublesome species, and are effective in both pre- and post-emergence application. A rather unusual activity that these herbicides possess is high pre-emergence phytotoxicity toward crabgrass in lawn and turf without appreciably damaging the lawn or turf. It is an additional advantage of the novel compositions of this invention that they may be used in various grades of purity ranging from the highly purified crystalline products to technical crudes depending upon the intended application. However, where the compounds are destined to be used as organic intermediates, high purity material is desirable.

Furthermore, when used as herbicides, these compositions offer the advantage of compatibility with a host of other herbicides including the tri- and tetrachlorophenylacetic acids and the sodium borates and calcium borates, 2,4-D and other herbicidal phenoxy aliphatic acids and esters, simazine and other herbicidal triazines, monuron, fenuron, diuron and other herbicidal ureas, metal chlorates, petroleum oils, hexachlorocyclopentadiene, pentachlorophenol, dinitro-o-alkylphenols, sodium trichloroacetate, and sodium 2,2-dichloropropionate, with fungicides such as the metal dimethyldithiocarbamates and ethylenebis-(dithiocarbamates), with insecticides such as benzene hexachloride and chlordane, with fertilizers such as urea and ammonium nitrate, and various adjuvants and diluents well known to the art. Thus, these herbicides may be used by themselves or made the subject of liquid or solid formulations ranging from the very simple to the most complex. For example, if desired, these compositions may be made into a liquid formulation by diluting, dispersing, dissolving or emulsifying with a surface active adjuvant or combination of these adjuvants in water or organic solvents such as petroleum hydrocarbons, alcohols, ketones, esters, glycols or combinations thereof. The use of water as solvent is particularly practicable with the soluble sodium, potassium, lithium, ammonium, mono-, di-, and trimethylammonium, mono-, di-, and triethylammonium, mono-, di-, and tri-(2-hydroxyethyl) ammonium and other lower alkylammonium salts of the acids of the invention. Or alternatively, the novel herbicides may be made up as solid formulations of powders, dusts, wettable dusts, granules and pellets using solid diluents such as talcs, clays, flours, starches, diatomaceous earths, mica, alkaline earth limes, carbonates and phosphates either finely divided, granular or pelleted in form.

These solid and liquid formulations facilitate handling and application and sometimes enhance herbicidal activity to more than an additive degree.

The liquid compositions, whether solutions or dispersions of the active agents in a liquid solvent and also the wettable powder or dust compositions of this invention, may contain as a conditioning agent one or more surface active agents in amounts sufficient to render the composition readily dispersible in water. By the term surface active agents are included wetting agents, dispersing agents, emulsifying agents and the like. A satisfactory, but not complete list of such agents is set forth in an article in "Soap and Chemical Specialties," Vol. 31, No. 7, pages 50–61; No. 8, pages 48–61; No. 9, pages 52–67, and No. 10, pages 38 (67) 1955. Other sources of adjuvant materials is set forth in Bulletin E–607 of the Bureau of Entomology and Plant Quarantine of the United States Department of Agriculture.

While the manner and method of application of the inventive compositions is varied and largely dependent upon the climatic conditions, crop treated, the weeds to be eradicated, the equipment available and the convenience of the user, a preferred embodiment of this invention is to apply these herbicides as a spray after making them up as a liquid formulation, which is dispersed in water and sprayed on the weed infested area. Or, alternatively, these compositions may be applied as a solid formulation directly to the ground in the weed-infested area.

The rate of application cannot be precisely stated due to varying degree of resistance possessed by the weed species and crop, the stage of weed and crop growth, the soil type and climatic conditions, but in general the rates will be a herbicidally effective amount, at least one-quarter of a pound of herbicide per acre, with the preferred range falling within one-half to fifty pounds per acre. Where the weeds are in an early stage of growth, being more susceptible, they will frequently respond to the rates from one-half to four pounds per acre, while older weeds or weeds are are to be totally eradicated from ornamental beds or turf may require rates in excess of four pounds per acre. In those instances where the weed population has been allowed to accumulate unchecked, or where mature plants are encountered, applications of up to 50 and even beyond this rate may be required. For eradication of deeply-rooted herbicide-resistant perennial weeds such as field bindweed, rates of 10 to 100 pounds are found best.

The compounds of the invention may also be used at sub-lethal rates as plant growth regulators, for example, to stunt the growth of trees under power lines, as chemotherapeutant growth retardants, versus Dutch elm disease and other vascular diseases, and other uses where it is intended to retard plant growth without killing.

The following examples are intended to illustrate the workings of this invention including such facets as the preparation of the herbicidal compositions, their formulation as herbicidal agents, and the testing results obtained using them.

The novel compositions of this invention are prepared in good yield from o-xylene, or commercial mixed xylenes containing a substantial portion of the ortho isomer, by introduction of chlorine gas at preferably zero to 100 degrees centigrade in the presence of a few parts per million up to several percent of a Lewis acid catalyst such as ferric chloride, antimony chloride, titanium chloride, or the like, until two chlorine atoms are substituted for hydrogen in the aromatic ring. Alternative chlorinating agents such as sulfuryl chloride may be used. The dichloro-o-xylene isomers may then be partially or totally separated by fractional distillation and crystallization such as descrbed by Boyars, J. Am. Chem. Soc., 75, 1989 (1953), or the mixture used without separation. The latter course is economically advantageous. In any case, the dichloro-o-xylene is preferably separated from the catalyst and from lower and higher chlorinated xylenes by distillation. The dichlorinated o-xylene isomer or mixture is then chlorinated in the side-chain to introduce one chlorine substituent in one of the methyl groups. This is generally done by introducing chlorine gas at 50 to 200 degrees centigrade in the absence of a Lewis acid catalyst and preferably under the influence of actinic light. It is advantageous to chlorinate to less than 100 percent conversion to avoid troublesome over-chlorinated by-products. The dichloro-o-xylyl chloride is then treated with a solution of an alkali metal cyanide, preferably in aqueous ethanol or methanol at or near reflux, to obtain a dichloro-o-tolylacetonitrile, which is isolated by stripping off the solvent and then hydrolyzed by heating with an aqueous acid such as 65 percent sulfuric acid, to form the dichloro-o-tolylacetic acid or with an aqueous base such as aqueous caustic soda to form a salt of the dichloro-o-tolylacetic acid. Or, the hydrolysis can be stopped at the amide stage by use of a more limited amount of water and the amide isolated. The acid chlorides, N-substituted amides, esters and salts are formed through reactions well established in organic chemistry. At any stage of the process following the initial chlorination of the aromatic ring, where desired, the more desirable 3,6- and 5,6-dichloro isomers can be separated by fractional distillation, crystallization or other means.

In the additional examples which follow the invention is further illustrated. Unless otherwise indicated, all parts and percentages are by weight and all temperatures are in degrees centigrade. Except as set forth in the specification and the claims, the examples are not to be construed in any manner or form as limiting the scope of the invention.

*Example 1.—Preparation of dichloro-ortho-tolulacetic acid*

Three hundred and eighteen parts of o-xylene and one part of ferric chloride was chlorinated by gaseous chlorine at 55 degrees until 175 parts of hydrogen chloride was evolved; the crude product was washed with water and fractionated to isolate the dichloro-o-xylene fraction (258 parts), boiling at 90 to 100 degrees (9 mm.). Analysis by infrared shows the mixture to contain 40 to 60 percent 3,6-isomer, the rest being mostly 4,5- with a lesser amount of 3,4-. This fraction was chlorinated by gaseous chlorine at 110 to 130 degrees under illumination by a mercury vapor lamp until approximately 0.6 to 0.8 molar equivalent of hydrogen chloride was evolved. The product was then refluxed for six hours with 100 parts of sodium cyanide in 100 parts of water and 300 parts of methanol. The reaction mixture was then stripped of solvent, washed with water to remove salts, and fractionated to isolate the dichloro-o-tolylacetonitrile as a cut boiling at 102 to 150 degrees (four mm.).

*Analysis.*—Calculated for $C_9H_7Cl_2N$: Cl, 35.5 percent. Found: Cl, 34.8 percent.

The nitrile was hydrolyzed by refluxing for one and one-half hour with a two-fold weight of 65 percent sulfuric acid, the aqueous acid then diluted with water and decanted. The product was washed with water and dried in vacuum to obtain crude dichloro-o-tolylacetic acid in 90 to 95 percent yield as a tan amorphous solid. Based on the isomer distribution of the initial dichloro-o-xylene, the technical product comprised approximately 40 to 60 percent 3,6-dichloro-isomer, the remainder being mostly 4,5- with lesser amounts of 3,4- and 5,6-dichloro-isomers.

*Analysis.*—Calculated for $C_9H_8O_2Cl_2$: neutralization equivalent, 219. Found: neutralization equivalent, 218.

Another portion of dichloro-o-tolylacetonitrile was dissolved in concentrated sulfuric acid at 80 to 120 degrees and the resultant solution poured into water, thereby precipitating dichloro-o-tolylacetamide in essentially quantitative yield, as a tan amorphous solid.

*Analysis.*—Calculated for $C_9H_9Cl_2NO$: Cl, 32.6 percent. Found: Cl, 33.1 percent.

Example 2

Using the method of Boyars (loc. cit.), dichloro-o-xylene was resolved into 4,5-dichloro-o-xylene and 3,6-dichloro-o-xylene. Each of these isomers was separately converted to the corresponding isomer of dichloro-o-tolylacetic acid and amide by the procedure of the foregoing example, and in each case the product was established as having the correct chlorine analysis, and, in the case of the acids, a neutralization equivalent in the range of 219 to 221.

The physical constants and analytical data for these new compounds are as follows:

|  | M.P., °C. | Neutral Equivalent | | Percent Chlorine | |
| --- | --- | --- | --- | --- | --- |
|  |  | Calcd. | Found | Calcd. | Found |
| 3,6-dichloro-o-tolylacetic acid | 117 | 219 | 220 | 32.4 | 32.2 |
| 3,6-dichloro-o-tolylacetamide | 176 |  |  | 32.5 | 32.2 |
| 4,5-dichloro-o-tolylacetic acid | 141 | 219 | 219 | 32.4 | 32.5 |
| 4,5-dichloro-o-tolylacetamide | 161.5 |  |  | 32.5 | 32.3 |

Example 3

Dichloro-o-tolylacetic acid made as described in Example 1 was applied at the rate of two pounds per acre to an area which was subsequently seeded with corn, onions, crabgrass, and lambsquarters. When inspected one month later, the emergence of the crabgrass and lambsquarters was found to be substantially prevented, whereas the corn and onions were healthy and uninjured.

Example 4

An isomer mixture of dichloro-o-tolylacetamide, made as in Example 1, was applied pre-emergence at two pounds per acre to an area seeded with chess, foxtail, and mustard. The emergence and growth of these weeds was almost entirely surpressed for one month.

Example 5

An aqueous solution of 3,6-dichloro-o-tolylacetic acid as the sodium salt was sprayed at the rate of 50 pounds per acre on an area infested with field bindweed and Johnson grass seedlings prior to onset of growth in the early spring. Almost one hundred percent control of these weeds was observed through the following summer. Similar results were obtained by use of the trimethylamine salt, the dimethylamine salt and the ammonium salt.

Example 6

An emulsifiable concentrate of 3,6-dichloro-o-tolylacetic acid was made by dissolving one part of the acid in five parts of xylene and one part of polyoxyethylene sorbitan laurate emulsifier. At two pounds per acre of the active ingredient, the emergence and growth of pigweed was completely inhibited for a two-week period.

Example 7

A granulated formulation was made starting with a mixed dichloro-o-tolylacetic acid of about 40 to 60 percent 3,6-dichloro-o-tolylacetic acid content, the rest being mainly 4,5- with lesser amounts of 5,6- and 3,4- isomers. The acid was melted at 120 to 140 degrees centigrade and sprayed onto tumbling clay granules of 24 to 48 mesh size in a heated drum, using nine parts by weight of clay per one part of total acid.

This granular formulation was applied at 100 pounds total weight per acre in the spring to a bluegrass and fescue turf infested with crabgrass and sorrel. Both of these weeds were substantially 100 percent controlled through the following summer without turf damage.

Example 8

A solution consisting of 119 parts of dichloro-o-tolylacetic acid, as prepared in Example 1, 119 parts of phenol, 300 parts of commercial xylene and 6 parts of concentrated sulfuric acid is heated to reflux. After refluxing for 16 hours, 17 parts of water azeotroped off. The xylene solution is washed with saturated sodium bicarbonate to remove any unreacted phenol and dichloro-o-tolylacetic acid. The xylene is then evaporated off and the product distilled at a boiling point of 170 to 180 degrees centigrade, at 0.75 mm. pressure, from which is obtained crude phenyl dichloro-o-tolylacetate in a 50 percent yield as a colorless semi-solid.

*Analysis.*—Calculated for $C_{15}H_{12}Cl_2O_2$: Cl, 24.0 percent. Found: Cl, 26.7 percent.

The phenyl esters of 3,6- and 4,5-dichloro-o-tolylacetic acid are similarly prepared starting from the pure acid isomers.

Example 9

An area infested with crabgrass, quackgrass, seedlings, foxtail, ryegrass, dock, mustard, pigweed, lambsquarters and chickweed was sprayed pre-emergence at the rate of eight pounds per acre with the various products of the invention and various related compounds. After one month, the degree of weed control in the treated areas relative to untreated control areas was noted and was evaluated as follows:

Compounds: Weed control rating
- o-Tolylacetic acid _____ 0
- Monochloro-o-tolylacetic acid (from mono-chlorinated o-xylene analogous to Example 1) __ 0–1
- Dichloro-o-tolylacetic acid (mixed isomers by method of Example 1) _____ 8
- 3,6-dichloro-o-tolylacetic acid _____ 10
- 3,4-dichloro-o-tolylacetic acid (from 3,4-dichloro-o-xylene, analogous to Example 1) _____ 0
- 4,5-dichloro-o-tolylacetic acid _____ 0
- Dichloro-m-tolylacetic acid (from m-xylene, analogous to Example 7) _____ 0–1
- 4,6-dichloro-m-tolylacetic acid (from pure 4,6-dichloro-m-xylene, analogous to Example 1; M.P. 109–111 degrees centigrade (from benzene)) _____ 0
- Phenyl dichloro-o-tolylacetate (mixed isomers) (as in Example 8) _____ 10
- Phenyl 3,6-dichloro-tolylacetate _____ 10
- Phenyl 4,5-dichloro-o-tolylacetate _____ 0
- Dichloro-o-tolylacetamide (as in Example 1) __ 10
- 3,6-dichloro-o-tolylacetamide _____ 10
- 4,5-dichloro-o-tolylacetamide _____ 0
- Dichloro-m-tolylacetamide (from m-xylene, analogous to Example 1) _____ 0

Scale: 0 = no effect; 1–4 = slight control; 5–7 = moderate control; 8–9 = good control; 10 = 100 percent control.

While there have been described various embodiments of the present invention, the methods described are not intended as limiting the scope of the invention. It is realized that changes therein are possible and it is further intended that each element recited in any of the following claims is to be understood as referring to all equivalent elements for accomplishing substantially the same results in substantially the same or equivalent manner. It is intended to cover the invention broadly in whatever form its principles may be utilized.

What is claimed is:
1. A method for the control of plant growth comprising applying to the locus to be treated a phytotoxic amount of a herbicide of the formula

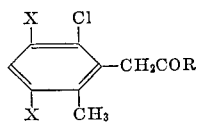

wherein R is a radical selected from the group consisting of hydroxy, alkoxy of from 1 to 18 carbon atoms, alkoxyalkoxy, alkoxyalkoxyalkoxy, haloalkyloxy, phenoxy, alkyl substituted phenoxy, amino, alkyl-substituted amino wherein the alkyl substituent contains from 1 to 18 carbon atoms, and halogen, and X is a substituent selected from the group consisting of hydrogen and halogen wherein only one X substituent is hydrogen.

2. The method of claim 1 wherein the compound applied is 3,6-dichloro-o-tolylacetic acid.

3. The method of claim 1 wherein the compound applied is 3,6-dichloro-o-tolylacetamide.

4. The method of claim 1 wherein the compound applied is 3,6-dichloro-o-tolylacetic acid phenyl ester.

5. The method of claim 1 wherein the compound applied is a water soluble mixture of the 3,6-dichloro-o-tolylacetic acid salt and the 4,5-dichloro-o-tolylacetic acid salt as major components, said salt anions being selected from the group consisting of sodium, potassium, lithium, ammonium, and mono-, di-, and tri- lower alkylammonium.

6. The method of claim 1 wherein the compound applied is a mixture of phenyl 3,6-dichloro-o-tolylacetate and phenyl 4,5-dichloro-o-tolyacetate as major components accompanied by small amounts of other phenyl dichloro-o-tolylacetate isomers.

7. The method of claim 1 wherein the compound applied is a mixture of 3,6-dichloro-o-tolylacetic acid and 4,5-dichloro-o-tolylacetic acid as major components accompanied by smaller amounts of other dichloro-o-tolylacetic acid isomers.

8. The method of claim 1 wherein the compound applied is a mixture of 3,6-dichloro-o-tolylacetamide and 4,5-dichloro-o-tolylacetamide as major components accompanied by smaller amounts of other dichloro-o-tolylacetamide isomers.

9. The method of claim 1 wherein the compound is applied as a pre-emergence herbicide.

10. The method of claim 1 wherein the compound is applied as a post-emergence herbicide.

References Cited

UNITED STATES PATENTS

| | | | |
|---|---|---|---|
| 2,370,394 | 2/1945 | Cass | 260—515 X |
| 2,394,916 | 2/1946 | Jones | 71—2.6 |
| 2,444,905 | 7/1948 | Sexton | 260—515 |
| 2,695,840 | 11/1954 | Leppla | 260—476 |
| 2,817,681 | 12/1957 | Terpstra | 260—515 |
| 2,889,382 | 6/1959 | Wohlers | 260—650 X |
| 2,938,053 | 5/1960 | Blake et al. | 260—535 X |
| 2,977,212 | 3/1961 | Tischler | 260—476 |
| 3,009,806 | 11/1961 | Weil et al. | 260—515 |
| 3,013,057 | 12/1961 | Richter | 260—473 |
| 3,013,058 | 12/1961 | Richter | 260—473 |

FOREIGN PATENTS

| | | |
|---|---|---|
| 1,224,787 | 2/1960 | France. |
| 877,067 | 9/1961 | Great Britain. |

OTHER REFERENCES

Marth et al., Botanical Gazetter, June 1949, pp. 632–636.

LEWIS GOTTS, *Primary Examiner.*

JAMES O. THOMAS, Jr., *Examiner.*